United States Patent
Park et al.

(10) Patent No.: US 12,451,535 B2
(45) Date of Patent: Oct. 21, 2025

(54) CAN FOR SECONDARY BATTERY AND SECONDARY BATTERY

(71) Applicant: LG Energy Solution, Ltd., Seoul (KR)

(72) Inventors: Yoon Woo Park, Daejeon (KR); Eui Hoon Myung, Daejeon (KR); Sang Ho Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 614 days.

(21) Appl. No.: 17/798,445

(22) PCT Filed: Mar. 8, 2021

(86) PCT No.: PCT/KR2021/002846
§ 371 (c)(1),
(2) Date: Aug. 9, 2022

(87) PCT Pub. No.: WO2021/182823
PCT Pub. Date: Sep. 16, 2021

(65) Prior Publication Data
US 2023/0066959 A1   Mar. 2, 2023

(30) Foreign Application Priority Data
Mar. 12, 2020 (KR) .................. 10-2020-0030912

(51) Int. Cl.
*H01M 10/613* (2014.01)
*H01M 10/64* (2014.01)
(Continued)

(52) U.S. Cl.
CPC ......... *H01M 10/613* (2015.04); *H01M 10/64* (2015.04); *H01M 10/6552* (2015.04); *H01M 50/148* (2021.01); *H01M 50/531* (2021.01)

(58) Field of Classification Search
CPC ............. H01M 10/613; H01M 10/615; H01M 10/617; H01M 10/64; H01M 10/6552;
(Continued)

(56) References Cited

U.S. PATENT DOCUMENTS

| 8,435,668 B2 | 5/2013 | Kumar et al. |
| 2001/0007728 A1 | 7/2001 | Ogata et al. |

(Continued)

FOREIGN PATENT DOCUMENTS

| CN | 1848518 A | 10/2006 |
| CN | 203056025 U | 7/2013 |

(Continued)

OTHER PUBLICATIONS

Extended European Search Report including Written Opinion for Application No. 21767252.6 dated Apr. 22, 2024, pp. 1-7.

(Continued)

*Primary Examiner* — Raymond Alejandro
(74) *Attorney, Agent, or Firm* — Lerner David LLP

(57) ABSTRACT

Disclosed herein is a can for a secondary battery and a secondary battery. The can for the secondary battery can include a can body with an electrode assembly accommodation part accommodating an electrode assembly. The can body can be opened to one side. The secondary battery can include a cover to cover one end of the can body to seal an opening. The opening can include a through-hole through which an electrode lead of the electrode assembly passes. The can body can include a body heat pipe that transfers heat so that the heat is dissipated through the can body when the heat generated in the electrode lead is transferred from the cover to the can body.

17 Claims, 6 Drawing Sheets

(51) Int. Cl.
*H01M 10/6552* (2014.01)
*H01M 50/148* (2021.01)
*H01M 50/531* (2021.01)

(58) Field of Classification Search
CPC ............. H01M 50/531; H01M 50/534; H01M 50/538; H01M 50/48; H01M 50/474
See application file for complete search history.

(56) References Cited

U.S. PATENT DOCUMENTS

| | | |
|---|---|---|
| 2006/0216582 A1 | 9/2006 | Lee et al. |
| 2007/0141452 A1 | 6/2007 | Kim |
| 2010/0216004 A1 | 8/2010 | Yoon |
| 2010/0236854 A1 | 9/2010 | Nakamura |
| 2011/0183178 A1 | 7/2011 | Sohn |
| 2012/0021260 A1 | 1/2012 | Yasui et al. |
| 2012/0164492 A1 | 6/2012 | Lachenmeier et al. |
| 2013/0149586 A1 | 6/2013 | Hong |
| 2019/0036091 A1 | 1/2019 | Lee et al. |

FOREIGN PATENT DOCUMENTS

| | | | |
|---|---|---|---|
| CN | 107634161 A | | 1/2018 |
| CN | 207217601 U | | 4/2018 |
| CN | 108987844 A | * 12/2018 | .......... H01M 10/613 |
| CN | 208723021 U | | 4/2019 |
| DE | 102012212451 A1 | | 2/2014 |
| DE | 102016200088 A1 | | 7/2017 |
| JP | 2000173664 A | | 6/2000 |
| JP | 2006278327 A | | 10/2006 |
| JP | 2009099305 A | | 5/2009 |
| JP | 2019192381 A | | 10/2019 |
| JP | 2022542762 A | | 10/2022 |
| KR | 100300428 B1 | | 9/2001 |
| KR | 20060102855 A | | 9/2006 |
| KR | 100635775 B1 | | 10/2006 |
| KR | 100717801 B1 | | 5/2007 |
| KR | 100728126 B1 | | 6/2007 |
| KR | 20110087842 A | | 8/2011 |
| KR | 101106356 B1 | | 1/2012 |
| KR | 20120014143 A | | 2/2012 |
| KR | 20140015647 A | | 2/2014 |
| KR | 101370144 B1 | | 3/2014 |
| KR | 20160041411 A | | 4/2016 |
| KR | 101658961 B1 | | 9/2016 |
| KR | 20170045686 A | | 4/2017 |
| KR | 20180044099 A | | 5/2018 |
| KR | 101945903 B1 | | 2/2019 |
| KR | 20190107478 A | | 9/2019 |
| WO | 2011092773 A1 | | 8/2011 |

OTHER PUBLICATIONS

International Search Report for Application No. PCT/KR2021/002846 mailed Jun. 21, 2021, pp. 1-3.

* cited by examiner

CAN FOR SECONDARY BATTERY AND SECONDARY BATTERY

CROSS-REFERENCE TO RELATED APPLICATION(S)

The present application is a national phase entry under 35 U.S.C. § 371 of International Application No. PCT/KR2021/002846 filed on Mar. 8, 2021, which claims the benefit of the priority of Korean Patent Application No. 10-2020-0030912, filed on Mar. 12, 2020, the disclosures of all of which are hereby incorporated by reference in their entirety.

TECHNICAL FIELD

The present invention relates to a can for a secondary battery and a secondary battery.

BACKGROUND ART

Secondary batteries are rechargeable unlike primary batteries, and, the possibility of compact size and high capacity is high. Thus, recently, many studies on secondary batteries are being carried out. As technology development and demands for mobile devices increase, the demands for secondary batteries increase as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

A cylindrical or prismatic battery according to the related art is constituted by an electrode assembly and a can accommodating the electrode assembly, and the can is constituted by a can body, in which an accommodation part is formed, and a cover covering the accommodation part.

Here, the cover through which an electrode lead of the electrode assembly passes is heated by heat generated in the electrode lead, and thus, only an end of the can body, which is adjacent to the cover, may be locally heated.

Thus, it has been difficult to dissipate the heat generated in the electrode lead.

[Prior Art Document] (Patent Document 1) Korean Patent Publication No. 10-2014-0015647

DISCLOSURE OF THE INVENTION

Technical Problem

One aspect of the present invention is to provide a can for a secondary battery, which is capable of uniformly distributing heat generated in a local region of a can to the can to dissipate the heat, and a secondary battery.

Technical Solution

A can for a secondary battery according to an embodiment of the present invention comprises: a can for a secondary battery and a secondary battery. The can for the secondary battery comprises a can body, in which an electrode assembly accommodation part accommodating an electrode assembly is formed, and which is opened to one side, and a cover which covers one end of the can body to seal an opening and in which a through-hole, through which an electrode lead of the electrode assembly passes, is formed, wherein the can body comprises a body heat pipe that transfers heat so that the heat is dissipated through the can body when the heat generated in the electrode lead is transferred from the cover to the can body.

A secondary battery according to an embodiment of the present invention comprises: an electrode assembly; and a can, wherein the can comprises: a can body, in which an electrode assembly accommodation part is formed, and which is opened to one side; and a cover which covers one end of the can body to seal an opening and in which a through-hole, through which an electrode lead of the electrode assembly passes, is formed, wherein the can body comprises a body heat pipe that transfers heat so that the heat is dissipated through the can body when the heat generated in the electrode lead is transferred from the cover to the one end of the can body.

Advantageous Effects

According to the present invention, the heat may be uniformly distributed to the can body through a heat pipe, through which the heat is effectively transferred to the can body, to effectively dissipate the heat. Therefore, the heat dissipation efficiency may be improved to increase battery lifespan and improve battery performance.

MODE FOR CARRYING OUT THE INVENTION

Figure 1:
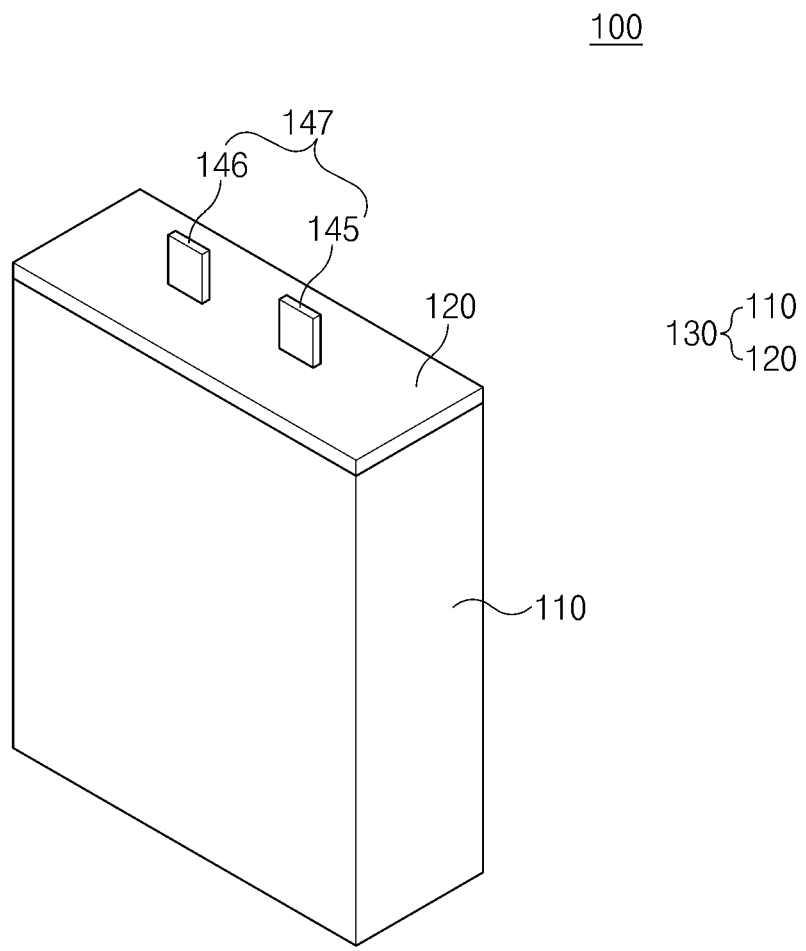
FIG. 1 is a perspective view illustrating a secondary battery with a can according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Can for Secondary Battery According to First Embodiment

Figure 2:
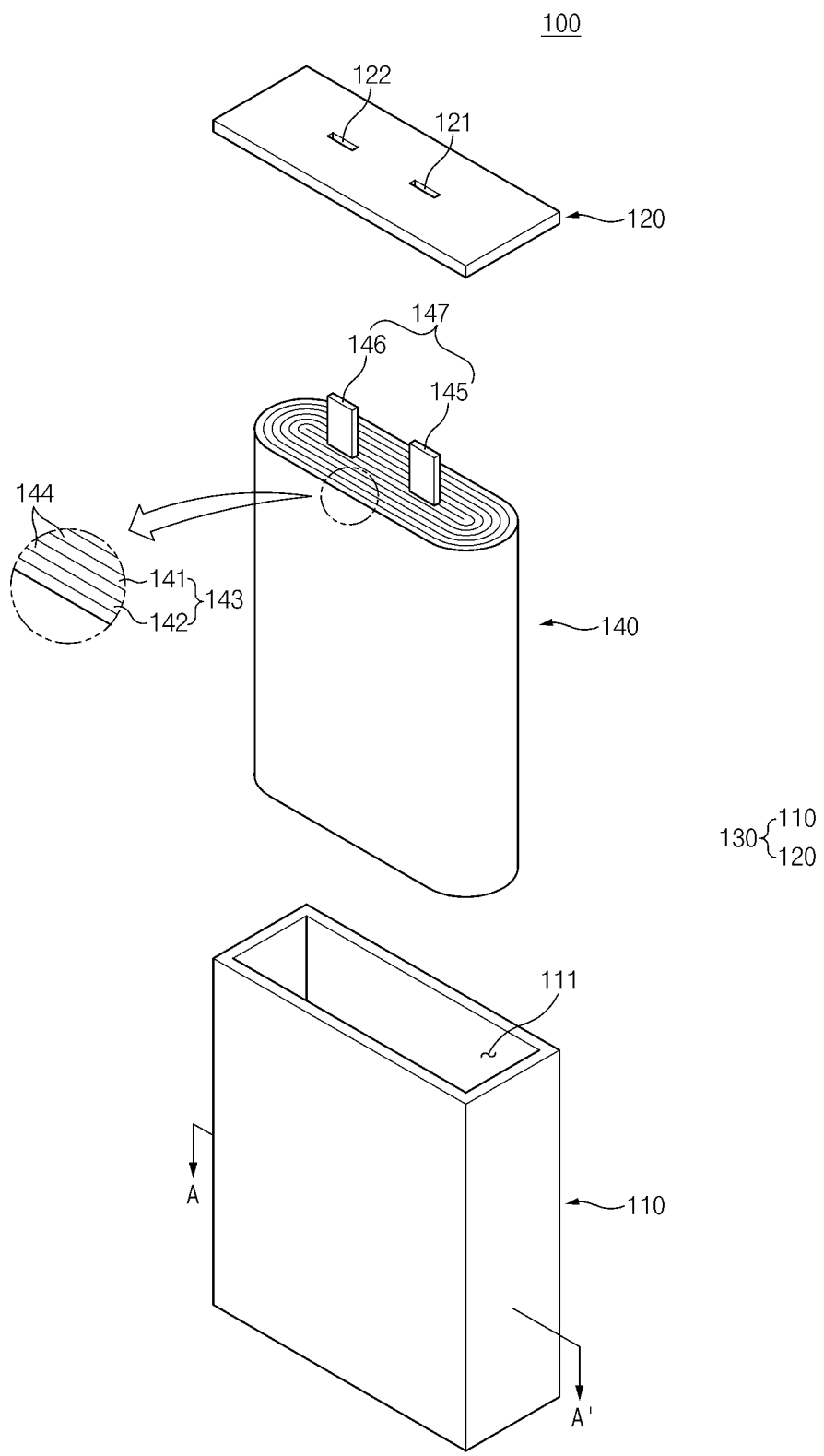
FIG. 2 is an exploded perspective view of the secondary battery of FIG. 1.
Figure 3:
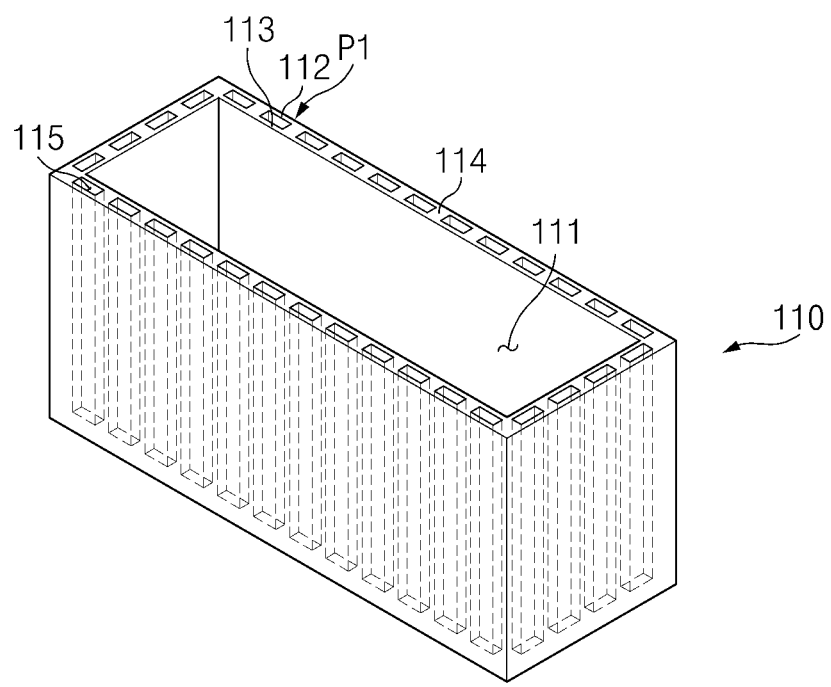
FIG. 3 is a perspective cross-sectional view taken along line A-A' of FIG. 2.

FIG. 1 is a perspective view illustrating a can for a secondary battery and a secondary battery comprising the can according to a first embodiment of the present invention, FIG. 2 is an exploded perspective view illustrating the can for the secondary battery and the secondary battery comprising the can according to the first embodiment of the present invention, and FIG. 3 is a perspective view taken along line A-A' of FIG. 2.

Referring to FIGS. 1 to 3, a can 130 for a secondary battery according to a first embodiment of the present invention comprises a can body 110 that is opened to accommodate an electrode assembly 140 and a cover 120 which seals the opening of the can body 110 and through which an electrode lead passes, and the can body 110 comprises a body heat pipe P1 that transfers heat generated in the electrode lead 147 to dissipate the heat through the can body 110 when the heat is transferred from the cover 120 to the can body 110.

In more detail, the can body 110 may form an electrode assembly accommodation part 111, in which the electrode assembly 140 is accommodated, and may be opened to one side.

Furthermore, the can body 110 may comprise an aluminum or copper material.

Also, the can body 110 may comprise the body heat pipe P1 that transfers heat so that the heat is dissipated through the can body 110 when the heat generated in the electrode lead 147 is transferred from the cover 120 to an end of one end of the can body 110.

The body heat pipe P1 comprises an inner wall 113 disposed at a side of the electrode assembly accommodation part 111, an outer wall 112 spaced a predetermined distance from the inner wall 113, a partition block 114, which partitions a space between the inner wall 113 and the outer wall 112 to form a plurality of body partition spaces 115, and a volatile heat medium that is accommodated in the body partition space 115.

The body heat pipe P1 may be formed in any one or more of a plurality of columns or rows along a longitudinal direction of the can body 110.

Here, for example, the body heat pipe P may be formed in a plurality of rows along the longitudinal direction of the can body 110.

The partition block 114 may have one side provided on the inner wall 113 and the other side provided on the outer wall 112 in a width direction.

The volatile heat medium may be vaporized to effectively transfer heat when the volatile heat medium is heated.

Here, the volatile heat medium may be made of at least one or more of acetone, water, freon, or ammonia.

The body partition space 115 in which the volatile heat medium is accommodated may be provided as a sealed vacuum space. Also, the body partition space may be formed along the longitudinal direction of the can body 110 so that the volatile heat medium accommodated in the body partition space 115 easily transfers the heat along the longitudinal direction of the can body 110. Here, when an upper end of the can body 110, which is in contact with the cover 120, is heated through the cover 120 due to the generation of heat in the electrode lead 147, the heat may be effectively transferred up to a lower portion of the can body 110 to easily dissipate the heat through the can body 110.

The cover 120 may cover the end of the onside of the can body 110 to seal the opening, and through-holes 121 and 122, through which the electrode lead 147 of the electrode assembly 140 passes, may be formed in the cover 120. Here, a lower edge of the cover 120 may be coupled or fixed to an upper end of the can body 110.

Also, the cover 120 may be formed in a rectangular or circular plate shape.

Also, the cover 120 may comprise an aluminum or copper material.

Here, when each of the can body 110 and the cover 120 comprises the aluminum material, the volatile heat medium may be acetone.

In the cover 120, an insulator may be disposed between the electrode lead 147 and each of the through-holes 121 and 122 to insulate the electrode lead 147 and the cover 120 from each other.

Also, an outer surface of each of the can body 110 and the cover 120 may be wrapped with the insulator to insulate the can 130 from the outside.

The can 130 for the secondary battery according to the first embodiment may further comprise thermal grease applied to the outer surface of the can body 110. Thus, the can body 110 may increase in thermal conductivity to improve a heat dissipation effect.

In the can 130 for the secondary battery according to the first embodiment of the present invention, which is configured as described above, the heat generated at a side of the cover provided with the electrode lead 147 may be effectively dissipated through the can body 110 provided with the body heat pipe P1. That is, when the cover 120 and the upper end of the can body 110, which is adjacent to the cover 120, are heated, the heat may be uniformly transferred to the entire can body 110 through the body heat pipe P1 provided on the can body 110 to realize the effective heat dissipation. Furthermore, even if heat is generated not only at the upper end of the can body 110 but also at other local portions of the can body 110, the heat may be uniformly effectively distributed to the entire can body 110 through the body heat pipe P and thus be effectively dissipated. Therefore, the heat dissipation efficiency may be improved to increase in battery lifespan and improve battery performance.

In addition, since the can body 110 is provided in a heat dissipation structure comprising the body heat pipe P1, it is not necessary to install a separate heat dissipation device, thereby securing flexibility in space utilization. Thus, when compared to a secondary battery or battery pack having the same size, it may have a remarkably high energy density. In addition, since the number of components for the heat dissipation decreases, the number of assembly processes may decrease to improve productivity. Here, according to the related art, heat dissipation is realized only when a heat transfer process is performed through a structure constituted by a cell, a cartridge, and a heat dissipation plate. On the other hand, according to the present invention, the structure for dissipating heat through the heat transfer process using the electrode assembly 140 and the can 130 comprising the body heat pipe P1 may be provided to reduce the number of components for the heat dissipation.

Furthermore, the heat pipe manner, in which the inner and outer surfaces of the can 130 are formed, and the partition space is formed therein, and then, the volatile liquid is put to make a vacuum state, thereby quickly transferring heat, according to the present invention may be applied to the can 130 having a thin thickness to increase in space that is occupied by the electrode assembly 140, thereby improving the energy density. However, for example, when the heat radiation grease or heat radiation pad is put in the partition space, the can 130 may increase in thickness. As a result, the space that is occupied by the electrode assembly may be reduced to deteriorate the energy efficiency. In addition, since the can 130 is designed to have the thin thickness, it may be difficult to apply the technology of putting the heat dissipation grease or heat dissipation pad in the partition space.

Can for Secondary Battery According to Second Embodiment

Hereinafter, a can for a secondary battery according to a second embodiment of the present invention will be described.

Figure 4:
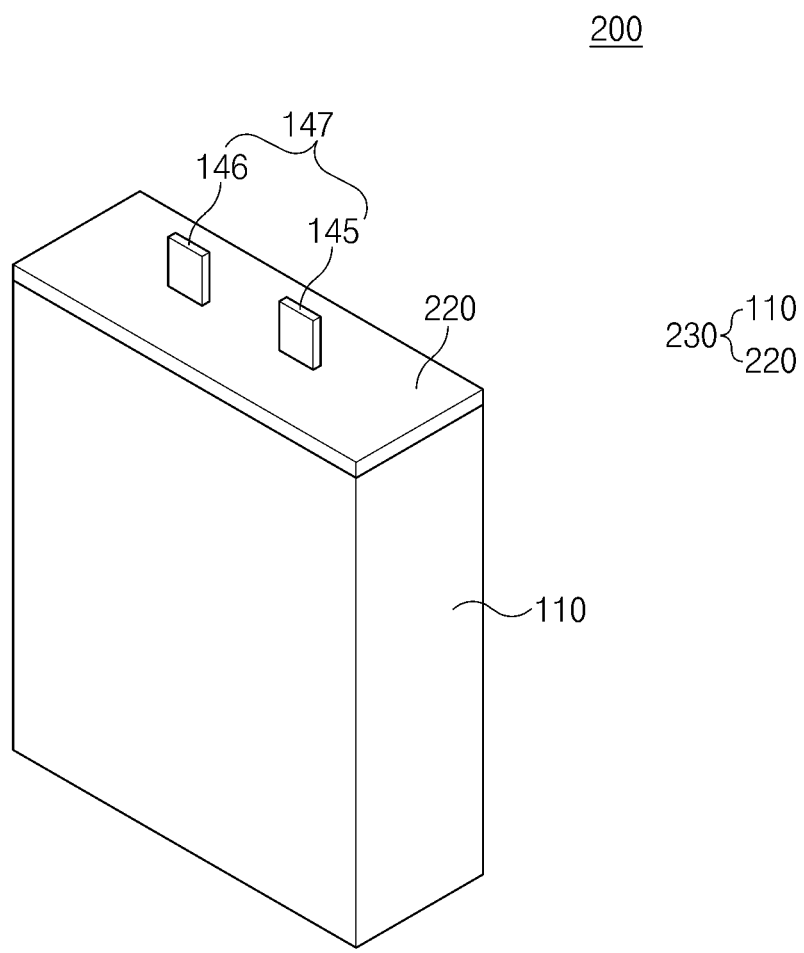
FIG. 4 is a perspective view illustrating a secondary battery with a can according to a second embodiment of the present invention.
Figure 5:
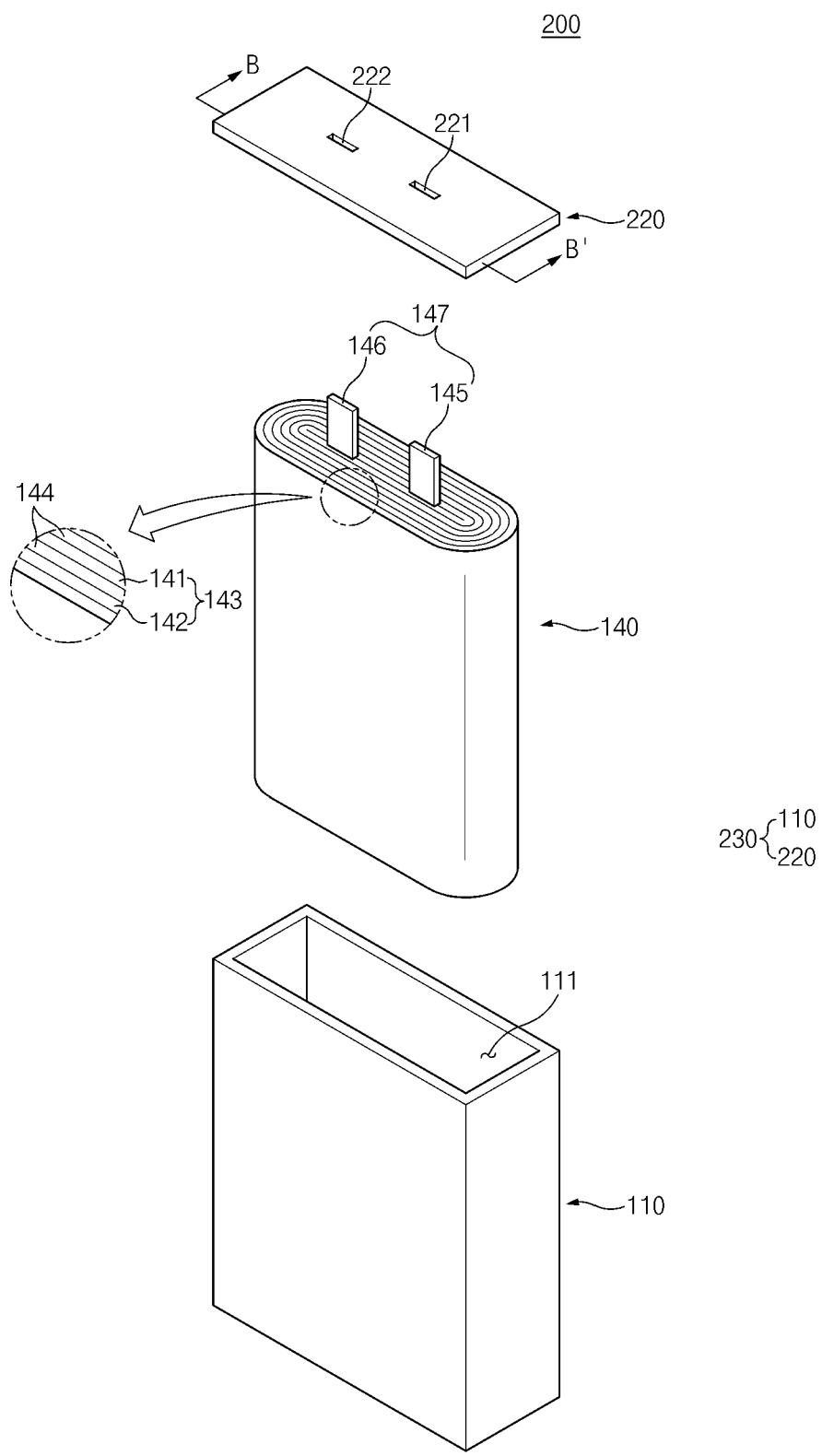
FIG. 5 is an exploded perspective view of the secondary battery of FIG. 4.
Figure 6:
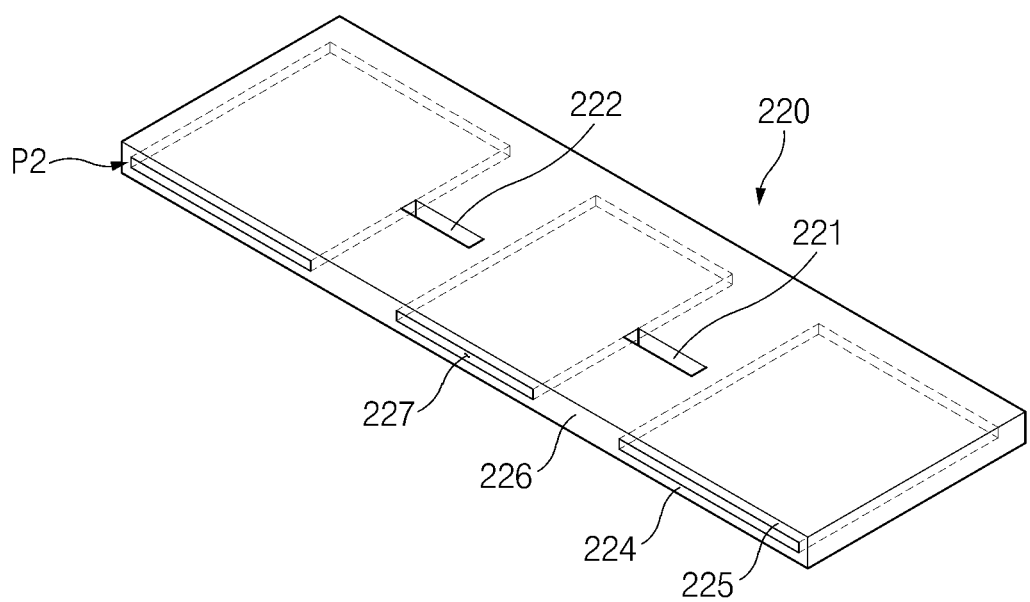
FIG. 6 is a perspective cross-sectional view taken along line B-B' of FIG. 5.

FIG. 4 is a perspective view illustrating a can for a secondary battery and a secondary battery comprising the can according to a second embodiment of the present invention, FIG. 5 is an exploded perspective view illustrating the can for the secondary battery and the secondary battery comprising the can according to the first embodiment of the present invention, and FIG. 6 is a cross-sectional view taken along line B-B' of FIG. 5.

Referring to FIGS. 4 to 6, a can 130 for a secondary battery according to a second embodiment of the present invention comprises a can body 110 that is opened to accommodate an electrode assembly 140 and a cover 220 which seals the opening of the can body 110 and through which an electrode lead passes, and the can body 110 comprises a body heat pipe that transfers heat generated in the electrode lead 147 to dissipate the heat through the can body 110 when the heat is transferred from the cover 220 to the can body 110.

The can 230 for the secondary battery according to the second embodiment of the present invention is different from the can for the secondary battery according to the foregoing first embodiment of the present invention in that the can 230 further comprises a cover heat pipe P2 on the cover 220. Thus, in description of the can 230 for the secondary battery according to this embodiment, contents duplicated with the can for the secondary battery according to the forgoing first embodiment of the present invention will be omitted or briefly described, and, differences therebetween will be mainly described.

In more detail, the can body 110 may form an electrode assembly accommodation part 111, in which the electrode assembly 140 is accommodated, and may be opened to one side.

Also, the can body 110 may comprise the body heat pipe that transfers heat so that the heat is dissipated through the can body 110 when the heat generated in the electrode lead 147 is transferred from the cover 220 to an end of one end of the can body 110.

Furthermore, the can body 110 may comprise an aluminum or copper material.

The cover 220 may cover the end of the onside of the can body 110 to seal the opening, and through-holes 221 and 222, through which the electrode lead 147 of the electrode assembly 140 passes, may be formed in the cover 120.

Also, the cover 220 may comprise an aluminum or copper material.

Furthermore, the cover 220 may comprise a cover heat pipe P2 that transfers heat so that the heat generated in the electrode lead 147 is dissipated through the cover 220.

The cover heat pipe P2 may comprise an inner plate 224 disposed at a side of an electrode assembly accommodation part 111, an outer plate 225 spaced a predetermined distance from the inner plate 224, a partition part 226 disposed between the inner plate 224 and the outer plate 225 to partition a space between the inner plate 224 and the outer plate 225 so as to form a plurality of cover partition spaces 227, and a volatile heat medium that is accommodated in a cover partition space 227.

Here, the volatile heat medium accommodated in the cover partition space 227 may be made of at least one or more of acetone, water, freon, or ammonia.

The cover partition space 227 in which the volatile heat medium is accommodated may be provided as a sealed vacuum space.

Here, when each of the can body 110 and the cover 220 comprises the aluminum material, the volatile heat medium may be acetone.

The can 230 for the secondary battery according to the second embodiment of the present invention, which is configured as described above, may be provided with the cover heat pipe P2 on the side of the cover 220 provided with the electrode lead 147, and thus, when peripheral portions of the through-holes 221 and 222 passing through the electrode lead 147 are heated by the electrode lead 147, heat may be easily transferred to the entire cover 220 and an upper end of the can body 110.

Thus, the heat generated in the electrode lead 147 may be transferred to the cover 220 and the upper end of the can body 110, which is adjacent to the cover 220, and thus be quickly uniformly transferred to the entire can body 110 provided with the body heat pipe to be more effectively dissipated.

Secondary Battery According to First Embodiment

Hereinafter, the secondary battery according to the first embodiment of the present invention will be described.

Referring to FIGS. 1 to 3, a secondary battery 100 according to the first embodiment of the present invention comprises an electrode assembly 140 and a can 130 accommodating the electrode assembly 140. The can 130 comprises a can body 110 that is opened to accommodate an electrode assembly 140 and a cover 120 which seals the opening of the can body 110 and through which an electrode lead passes, and the can body 110 comprises a body heat pipe P1 that transfers heat generated in the electrode lead 147 to dissipate the heat through the can body 110 when the heat is transferred from the cover 120 to the can body 110.

The secondary battery 100 according to the first embodiment of the present invention relates to a secondary battery 100 comprising the can 130 for the secondary battery according to the first embodiment of the present invention. Thus, in description of the secondary battery 100 according to the first embodiment, contents duplicated with the can 130 for the secondary battery according to the first embodiment described above will be omitted or briefly described, and differences therebetween will be mainly described.

In more detail, the secondary battery 100 comprises the electrode assembly 140 and the can 130 accommodating the electrode assembly 140.

The electrode assembly 140 may be a chargeable and dischargeable power generation element and may comprise electrodes 142 and separators 144, which are alternately stacked. Here, the electrode assembly 140 may be provided in a wound form.

The electrodes 142 may comprise a positive electrode 141 and a negative electrode 142. Here, the electrode assembly 140 may have a structure in which the positive electrode 141/the separator 144/the negative electrode 142 are alternately laminated. Also, the electrode lead 147 may comprise a positive electrode lead 145 connected to the positive electrode 141 and a negative electrode lead 146 connected to the negative electrode 142.

The positive electrode 141 may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode 142 may comprise a negative electrode collector and a negative electrode active material stacked on the negative electrode collector.

The negative electrode collector may be made of, for example, a foil made of a copper (Cu) material.

The negative active material may be a compound or a mixture containing a graphite-based material.

The separator 144 is made of an insulation material to electrically insulate the positive electrode 141 from the negative electrode 142. Here, the separator 144 may be made of a polyolefin-based resin film such as polyethylene or polypropylene having micropores.

The can body 110 may form an electrode assembly accommodation part 111, in which the electrode assembly 140 is accommodated, and may be opened to one side.

Also, the can body 110 may comprise the body heat pipe P1 that transfers heat so that the heat is dissipated through the can body 110 when the heat generated in the electrode lead 147 is transferred from the cover 120 to an end of one end of the can body 110.

The body heat pipe P1 comprises an inner wall 113 disposed at a side of the electrode assembly accommodation part 111, an outer wall 112 spaced a predetermined distance from the inner wall 113, a partition block 114 disposed between the inner wall 113 and the outer wall 112 to partition a space between the inner wall 113 and the outer wall 112 so as to form a plurality of body partition spaces 115, and a volatile heat medium that is accommodated in the body partition space 115.

The body heat pipe P1 may be formed in any one or more of a plurality of columns or rows along a longitudinal direction of the can body 110. Here, for example, the body heat pipe P may be formed in a plurality of rows along the longitudinal direction of the can body 110.

The partition block 114 may have one side provided on the inner wall 113 and the other side provided on the outer wall 112 in a width direction.

The volatile heat medium may be made of at least one or more of acetone, water, freon, or ammonia.

The body partition space 115 in which the volatile heat medium is accommodated may be provided as a sealed vacuum space.

The cover 120 may cover the end of the onside of the can body 110 to seal the opening, and through-holes 121 and 122, through which the electrode lead 147 of the electrode assembly 140 passes, may be formed in the cover 120.

Secondary Battery According to Second Embodiment

Hereinafter, a secondary battery according to a second embodiment of the present invention will be described.

Referring to FIGS. 4 to 6, a secondary battery 200 according to the second embodiment of the present invention comprises an electrode assembly 140 and a can 230 accommodating the electrode assembly 140. The can 230 comprises a can body 110 that is opened to accommodate an electrode assembly 140 and a cover 220 which seals the opening of the can body 110 and through which an electrode lead passes, and the can body 110 comprises a body heat pipe that transfers heat generated in the electrode lead 147 to dissipate the heat through the can body 110 when the heat is transferred from the cover 220 to the can body 110.

The secondary battery 200 according to the second embodiment of the present invention relates to a secondary battery 200 comprising the can 230 for the secondary battery according to the forgoing second embodiment of the present invention. Thus, in description of the secondary battery 200 according to this embodiment, contents duplicated with the can 230 for the secondary battery according to the forgoing second embodiment of the present invention will be omitted or briefly described, and, differences therebetween will be mainly described.

In more detail, the secondary battery 200 comprises the electrode assembly 140 and the can 230 accommodating the electrode assembly 140.

The can body 110 may form an electrode assembly accommodation part 111, in which the electrode assembly 140 is accommodated, and may be opened to one side.

Also, the can body 110 may comprise the body heat pipe that transfers heat so that the heat is dissipated through the can body 110 when the heat generated in the electrode lead 147 is transferred from the cover 220 to an end of one end of the can body 110.

The cover 220 may cover the end of the onside of the can body 110 to seal the opening, and through-holes 221 and 222, through which the electrode lead 147 of the electrode assembly 140 passes, may be formed in the cover 120.

In addition, the cover 220 may comprise a cover heat pipe P2 that transfers heat so that the heat generated in the electrode lead 147 is dissipated through the cover 220.

The cover heat pipe P2 may comprise an inner plate 224 disposed at a side of an electrode assembly accommodation part 111, an outer plate 225 spaced a predetermined distance from the inner plate 224, a partition part 226 disposed between the inner plate 224 and the outer plate 225 to partition a space between the inner plate 224 and the outer plate 225 so as to form a plurality of cover partition spaces 227, and a volatile heat medium that is accommodated in a cover partition space 227.

The cover partition space 227 in which the volatile heat medium is accommodated may be provided as a sealed vacuum space.

While the present invention has been particularly shown and described with reference to the specific embodiments thereof, the can for the secondary battery and the secondary battery according to the present invention are not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS 100, 200: Secondary battery
110: Can body
111: Electrode assembly accommodation part
112: Outer wall
113: Inner wall
114: Partition block
115: Body partition space
120, 220: Cover
121, 122, 221, 222: Through-hole
130, 230: Can
140: Electrode assembly
141: Positive electrode
142: Negative electrode
143: Electrode
144: Separator
145: Positive electrode lead
146: Negative electrode lead
147: Electrode lead
224: Inner plate
225: Outer plate
226: Partition part
227: Cover partition space
P1: Body heat pipe
P2: Cover heat pipe

The invention claimed is:

1. A can for a secondary battery, comprising:
a can body including an electrode assembly accommodation part to accommodate an electrode assembly, the can body including an opening on a first side thereof; and
a cover to cover the first side of the can body to seal the opening, the covering including a through-hole, an electrode lead of the electrode assembly extending through the through-hole,
wherein the can body comprises a body heat pipe that transfers heat,
wherein the body heat pipe comprises:
an inner wall adjacent the electrode assembly accommodation part;
an outer wall spaced a predetermined distance from the inner wall;
a partition block disposed between the inner wall and the outer wall to partition a space between the inner wall and the outer wall to form a plurality of body partition spaces; and
a volatile heat medium accommodated in the body partition spaces.

2. The can for the secondary battery of claim 1, wherein heat generated in the electrode lead is transferred from the cover to the can body, the body heat pipe configured to dissipate the heat through the can body.

3. The can for the secondary battery of claim 1, wherein the can body receives heat generated in the electrode lead from the cover to dissipate the heat.

4. The can for the secondary battery of claim 1, wherein the body heat pipe is formed in any one or more of a plurality of columns or rows along a longitudinal direction of the can body.

5. The can for the secondary battery of claim 1, wherein one side of the partition block is adjacent the inner wall and an opposite side is adjacent the outer wall, a distance between the one side and the opposite side defining a width of the partition block.

6. The can for the secondary battery of claim 1, wherein the cover comprises a cover heat pipe to transfer heat generated in the electrode lead through the cover.

7. The can for the secondary battery of claim 6, wherein the cover heat pipe comprises:
an inner plate disposed adjacent the electrode assembly accommodation part;
an outer plate spaced a predetermined distance from the inner plate;
a partition part disposed between the inner plate and the outer plate to partition a space between the inner plate and the outer plate to form a plurality of cover partition spaces; and
a volatile heat medium that is accommodated in the cover partition spaces.

8. The can for the secondary battery of claim 7, wherein the volatile heat medium is made of at least one or more of acetone, water, freon, or ammonia.

9. The can for the secondary battery of claim 8, wherein each of the body and the cover partition spaces is a sealed vacuum space.

10. The can for the secondary battery of claim 7, wherein each of the can body and the cover comprises an aluminum or copper.

11. A secondary battery comprising:
an electrode assembly; and
a can,
wherein the can comprises:
a can body including an electrode assembly accommodation part, the can body including an opening on a first side thereof; and
a cover to cover the first side of the can body to seal the opening, the cover including a through-hole, an electrode lead of the electrode assembly extending through the through-hole,
wherein the can body comprises a body heat pipe to transfer heat generated in the electrode lead, the heat being transferred from the cover to one end of the can body and dissipated by the body heat pipe through the can body,
wherein the body heat pipe comprises:
an inner wall adjacent the electrode assembly accommodation part;
an outer wall spaced a predetermined distance from the inner wall;
a partition block disposed between the inner wall and the outer wall to partition a space between the inner wall and the outer wall to form a plurality of body partition spaces; and
a volatile heat medium accommodated in the body partition spaces.

12. A can for a secondary battery, comprising:
a can body including an electrode assembly accommodation part to accommodate an electrode assembly, the can body including an opening on a first side thereof; and
a cover to cover the first side of the can body to seal the opening, the covering including a through-hole, an electrode lead of the electrode assembly extending through the through-hole,
wherein the can body comprises a body heat pipe that transfers heat, the body heat pipe includes a plurality of discrete body partition spaces, each of the plurality of discrete body partition spaces encased within the can body.

13. The can for the secondary battery of claim 12, wherein heat generated in the electrode lead is transferred from the cover to the can body, the body heat pipe configured to dissipate the heat through the can body.

14. The can for the secondary battery of claim 12, wherein the cover comprises a cover heat pipe to transfer heat generated in the electrode lead through the cover.

15. The can for the secondary battery of claim 12, wherein the body heat pipe includes a volatile heat medium accommodated in at least one of the plurality of discrete body partition spaces.

16. The can for the secondary battery of claim 15, wherein the volatile heat medium is made of at least one or more of acetone, water, freon, or ammonia.

17. The can for the secondary battery of claim 12, wherein each of the plurality of discrete body partition spaces is a sealed vacuum space.

\* \* \* \* \*